(12) United States Patent
Miyanaga (10) Patent No.: US 8,608,413 B2
(45) Date of Patent: Dec. 17, 2013

(54) SHANK ATTACHMENT DEVICE

(75) Inventor: Masaaki Miyanaga, Miki (JP)

(73) Assignee: Kabushiki Kaisha Miyanaga, Miki-shi (JP)

( * ) Notice: Subject to any disclaimer, the term of this patent is extended or adjusted under 35 U.S.C. 154(b) by 968 days.

(21) Appl. No.: 12/513,130

(22) PCT Filed: Apr. 3, 2007

(86) PCT No.: PCT/JP2007/057428
§ 371 (c)(1),
(2), (4) Date: Jan. 20, 2010

(87) PCT Pub. No.: WO2008/056455
PCT Pub. Date: May 15, 2008

(65) Prior Publication Data
US 2010/0127465 A1    May 27, 2010

(30) Foreign Application Priority Data
Nov. 6, 2006 (WO) .................. PCT/JP2006/322102

(51) Int. Cl.
B23B 41/02 (2006.01)
(52) U.S. Cl.
USPC ........................ 408/204; 408/239 R; 408/120
(58) Field of Classification Search
USPC ...................... 408/204, 239 R, 120
See application file for complete search history.

(56) References Cited

FOREIGN PATENT DOCUMENTS

| JP | 08-281635 | 10/1996 |
|---|---|---|
| JP | 09-309106 | 2/1997 |
| JP | 10-006112 | 1/1998 |
| JP | 10-100102 | 4/1998 |
| JP | 2002-192412 | 7/2002 |
| JP | 2004-034210 | 2/2004 |
| RU | 2060116 C1 | 5/1996 |
| SU | 98880 | 9/1958 |
| SU | 119053 | 9/1958 |
| WO | WO-2004/026513 A1 | 4/2004 |
| WO | WO-2004/082875 A1 | 9/2004 |

OTHER PUBLICATIONS

Machine Translation of JP2004-034210A; Inventor: Miyanaga; Feb. 5, 2004.*
Machine Translation of JP10-006112A; Inventor: Ohira; Jan. 13, 1998.*
International Search Report for PCT/JP2007/057428, mailed Jul. 10, 2007.

(Continued)

*Primary Examiner* — Essama Omgba
*Assistant Examiner* — Ryan J Walters
(74) *Attorney, Agent, or Firm* — Marshall, Gerstein & Borun LLP (57) ABSTRACT

A shank attachment device attaches a core drill to a rotating portion of a drill device and includes an arbor and a shank. The arbor is detachably attachable to the rotating portion. The arbor and the shank are detachably attachable to each other. The shank is detachably attachable to the core drill. A stopper engages a groove of the shank to stop a movement of the shank in an axial direction away from the arbor. A rotational torque of the arbor can be transmitted to the shank by engaging a first engaging portion of the arbor with a first engaged portion of the shank. The shank contacts the arbor to stop the movement of the shank in the axial direction toward the arbor.

8 Claims, 7 Drawing Sheets

(56) References Cited

OTHER PUBLICATIONS

Extended European Search Report for European Patent Application No. 07740864.9, dated May 22, 2012.

Decision on Grant for Russian Patent Application No. 2009121570/02(029813), received Jun. 29, 2010.

Office Action for Russian Patent Application No. 2009121570/02(029813), dated Apr. 6, 2010.

* cited by examiner

PRIOR ART

SHANK ATTACHMENT DEVICE

TECHNICAL FIELD

The present invention relates to a shank attachment device configured to detachably attach a drill including a core drill to a rotating portion of a drill device and capable of transmitting a comparatively high rotational torque of the drill device to the drill.

BACKGROUND ART

Figure 9:
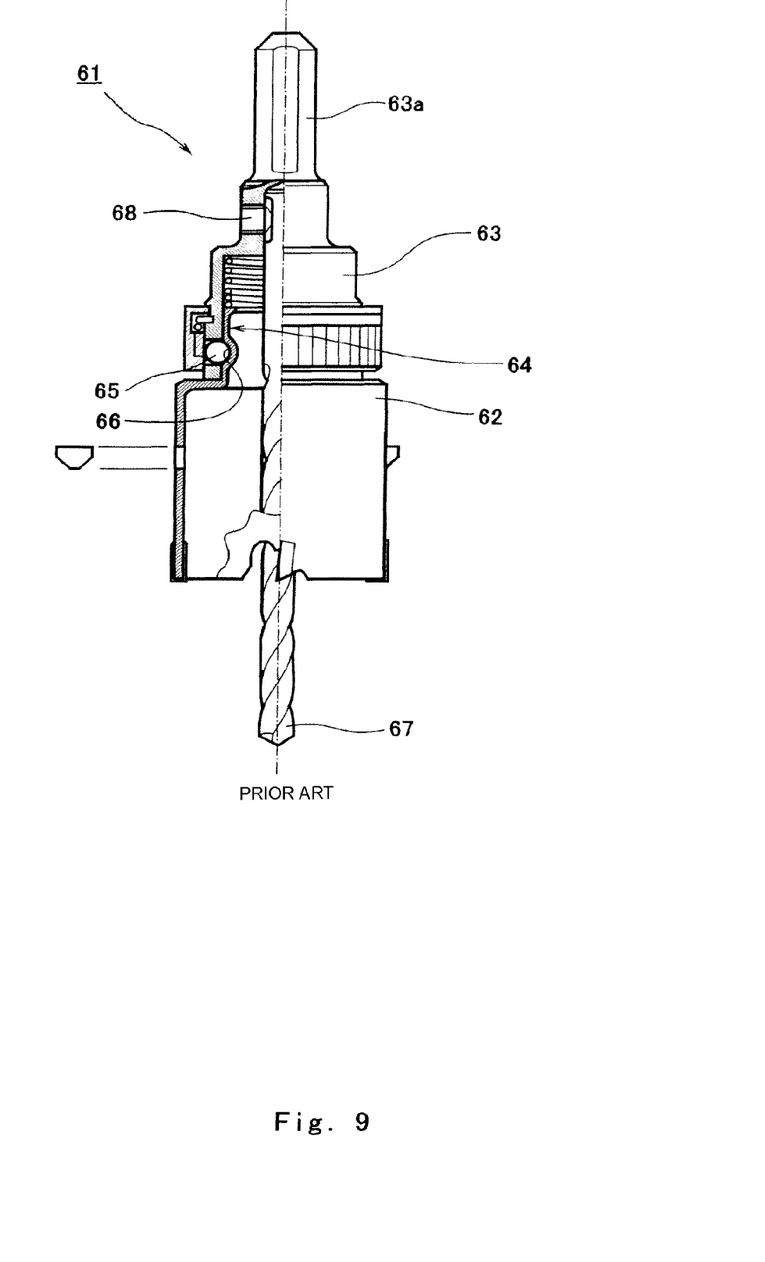
FIG. 9 is a partial cross-sectional front view showing a conventional shank attachment device.

One example of a conventional shank attachment device is shown in FIG. 9 (Patent Document 1). A shank attachment device 61 shown in FIG. 9 is configured to attach a core drill 62 to a rotating portion of a drill device (not shown), and includes an arbor 63 and a shank 64. An attachment shaft 63a formed on the arbor 63 is detachably attachable to the rotating portion of the drill device. The arbor 63 and the shank 64 are detachably attachable to each other. The shank 64 is coupled to the core drill 62.

In a state where the shank 64 is attached to the arbor 63, a stopper steel ball 65 disposed on the arbor 63 engages with a stopper concave portion 66 formed on the shank 64. Since the stopper steel ball 65 and the stopper concave portion 66 engage with each other, a movement of the shank 64 in an axial direction away from the arbor 63 can be stopped, and the rotational torque of the arbor 63 can be transmitted to the shank 64 and the core drill 62.

Moreover, in the conventional shank attachment device 61 shown in FIG. 9, a center drill attachment hole is formed in the arbor 63, and a base end portion of a center drill 67 is inserted into the center drill attachment hole. The base end portion of the center drill 67 is fixed to the arbor 63 by a fixing screw 68, and the fixing screw 68 threadedly engages with a fixing screw hole formed on the arbor 63.

Patent Document 1: Japanese Laid-Open Patent Application Publication 2002-192412

DISCLOSURE OF THE INVENTION

Problems to be Solved by the Invention

However, in a case where the conventional shank attachment device 61 shown in FIG. 9 is designed to be able to adequately endure the rotational torque impulsively applied to the stopper steel ball 65 and the stopper concave portion 66 for example, the shank attachment device 61 may increase in size, and this may deteriorate workability of hole drilling operations. This is because since the engagement of the stopper steel ball 65 with the stopper concave portion 66 achieves two effects that the rotational torque of the arbor 63 can be transmitted to the shank 64 and the core drill 62, and the movement of the shank 64 in the axial direction away from the arbor 63 can be stopped, the conventional shank attachment device 61 has to be configured to also have an axial force of coupling the shank 64 and the arbor 63 in order that the conventional shank attachment device 61 can transmit high rotational torque, and this narrows the range of configuration choice for the reduction in size.

Moreover, in a case where the core drill 62 and the center drill 67 are attached to the shank attachment device 61 as shown in FIG. 9, and the shank attachment device 61 is used, the fixing screw 68 which fixes the center drill 67 to the arbor 63 may loosen and fall out by vibrations of the hole drilling operations.

The present invention was made to solve the above problems, and an object of the present invention is to provide a shank attachment device capable of transmitting a comparatively high rotational torque and comparatively reducing in size.

Means for Solving the Problems

A shank attachment device according to the present invention is configured to attach a drill to a rotating portion of a drill device and includes an arbor and a shank, the arbor being detachably attachable to the rotating portion, the arbor and the shank being detachably attachable to each other, and the shank being detachably attachable to the drill, wherein: with the shank attached to the arbor, a stopper member disposed on the arbor engages with a stopper groove formed on a side surface of the shank to stop a movement of the shank in an axial direction away from the arbor; a first engaging portion formed on the arbor engages with a first engaged portion formed on the shank to enable a rotational torque of the arbor to be transmitted to the shank; and the shank contacts the arbor to stop the movement of the shank in the axial direction toward the arbor.

In the case of carrying out the hole drilling operation using the shank attachment device according to the present invention, for example, first, the shank is attached to the arbor, the drill is attached to the shank. Then, the arbor to which the shank and the drill have been attached is attached to the rotating portion of the drill device. Then, by causing the drill device to operate, a hole can be formed on a workpiece by the drill. Moreover, since the stopper member disposed on the arbor engages with the stopper groove formed on the shank with the shank attached to the arbor, it is possible to stop the movement of the shank in the axial direction away from the arbor, so that the shank is not detached from the arbor. Further, in this state, the first engaging portion formed on the arbor engages with the first engaged portion formed on the shank. Therefore, it is possible to transmit the rotational torque of the arbor to the shank. Then, in this state, the shank contacts the arbor, so that it is possible to surely stop the movement of the shank in the axial direction toward the arbor. Therefore, the arbor can receive an axial impact generated in the hole drilling operation through the contact portion. With this, it is possible to effectively carry out the hole drilling operation. Moreover, the drill is detachably attached to the shank. Therefore, if the drill that is the consumable member is worn, only the drill may be replaced, and the shank can be continuously used.

The shank attachment device according to the present invention may be configured such that with the drill attached to the shank, a second engaging portion formed on the shank engages with a second engaged portion formed on the drill to enable a rotational torque of the shank to be transmitted to the drill. With this, the comparatively high rotational torque of the shank can be transmitted to the drill, such as the core drill, through the second engaging portion and the second engaged portion which engage with each other, and a hole having a comparatively large diameter can be cut.

The shank attachment device according to the present invention may be configured such that: the first engaging portion is a concave portion or a convex portion, and the first engaged portion is a convex portion or a concave portion; and the second engaging portion is a concave portion or a convex portion, and the second engaged portion is a convex portion or a concave portion. With this, the comparatively high rotational torque of the arbor can be transmitted to the shank, and the comparatively high rotational torque of the shank can be transmitted to the drill by a comparatively simple configuration. The shank attachment device according to the present invention may be configured such that: the first engaged portion and the second engaging portion are formed on an annular torque transmitting member; and with the annular torque transmitting member and the drill engaging with each other, the annular torque transmitting member and the drill are fastened to the shank by a screw. Thus, in a case where the first engaged portion and the second engaging portion are formed on the annular torque transmitting member, the comparatively high rotational torque can be transmitted by increasing the diameter of the annular torque transmitting member and increasing the distance from the rotation center to each of the first engaging portion, the first engaged portion, the second engaging portion, and the second engaged portion. Then, since the annular torque transmitting member can be manufactured separately from the arbor and the shank, it can be manufactured comparatively easily as compared to a case where it is manufactured integrally with the arbor and the shank.

The shank attachment device according to the present invention may be configured such that: the arbor includes an attachment shaft attached to the rotating portion of the drill device, an enlarged diameter portion is formed at a tip end portion of the attachment shaft, and the enlarged diameter portion is detachably coupled to a base body of the arbor by a screw; the shank is configured to be detachably attached to a shank attachment hole formed on the arbor; a center drill attachment hole communicated with the shank attachment hole is formed on the base body of the arbor; a fixing screw hole including an internal screw on an inner peripheral surface thereof is formed to extend from an outer peripheral surface of the base body to a center of the center drill attachment hole in a direction perpendicular to the center drill attachment hole; a fixing screw threadedly engages with the fixing screw hole such that a tip end thereof is able to project into the center drill attachment hole; and the enlarged diameter portion covers from outside at least a part of the fixing screw, which threadedly engages with the fixing screw hole, to prevent the fixing screw from falling out to an outside of the base body.

Thus, the arbor is configured to be divisible into an attachment shaft side portion and a base body side portion which are detachably attachable to each other. With this, when the attachment shaft is damaged, the damaged attachment shaft side portion can be replaced with a different attachment shaft side portion. In this case, since it is unnecessary to replace the base body side portion, it is economical. Then, with the center drill inserted into the center drill attachment hole, the center drill can be fixed to the base body of the arbor by the fixing screw. The fixing screw may loosen by vibrations of the hole drilling operations using the drill and the center drill. However, since the enlarged diameter portion of the arbor covers from outside at least a part of the fixing screw which threadedly engages with the fixing screw hole, it is possible to prevent the fixing screw from falling out from the base body.

The shank attachment device according to the present invention may be configured such that the shank is configured to be detachably attached to a shank attachment hole formed on the arbor, and the shank attachment device may further include a supporting member which prevents the stopper member from projecting into the shank attachment hole in a state where the shank is not attached to the shank attachment hole, wherein: the supporting member is formed by a tip end of a coil spring disposed in the shank attachment hole; and a base end portion of the coil spring is engageably attached to an engaging groove portion formed around an inner peripheral surface of a deep side portion of the shank attachment hole.

Thus, by forming the supporting member, which prevents the stopper member from projecting into the shank attachment hole, by the tip end of the coil spring disposed in the shank attachment hole, it is possible to reduce the number of components only by the supporting member.

Effects of the Invention

In accordance with the shank attachment device of the present invention, in a case where the shank attachment device is designed to be able to adequately endure the rotational torque impulsively applied thereto, the strength of the first engaging portion of the arbor in a direction in which the rotational torque is applied and the strength of the first engaged portion of the shank in a direction in which the rotational torque is applied may be increased. Therefore, it is unnecessary to increase the strength of engagement of the stopper member with the stopper groove which engagement stops the movement of the shank in the axial direction away from the arbor. On this account, the shank attachment device can be comparatively reduced in size. Moreover, a contact portion of the shank and the arbor can receive an axial impact generated in the hole drilling operations. Therefore, it is unnecessary to consider the strengths of the first engaging portion, the first engaged portion, the stopper member, and the stopper groove with respect to the axial impact. On this account, the shank attachment device can be reduced in size.

EXPLANATION OF REFERENCE NUMBERS

A, B shank attachment device
D drill device

D1 rotating portion of drill device
1 arbor
2, 3 shank
4 shank main body
11A attachment shaft
11B enlarged diameter portion
11a internal screw hole
11b flat surface
11e engagement groove
12 base body
12A shank attachment hole
12D center drill attachment hole
12E fixing screw hole
12G first engaging portion
12a concave portion
12b external screw portion
12c stopper member accommodating hole
12f engaging groove portion
12p flat surface
13 operating sleeve
13a, 13c enlarged diameter portion of operating sleeve
13b reduced diameter portion of operating sleeve
13d enlarged diameter portion of operating sleeve
14, 30 coil spring
15, 20 flange portion
16 stopper ring
17 stopper member
20G first engaged portion
20a convex portion
21 inserting portion
21A stopper groove
22 drill attachment portion
25 external screw
30a base end portion of coil spring
30b tip end portion of coil spring
40 center drill
41 fixing screw
50, 51 core drill (drill)
50a internal screw
51a second engaged portion of core drill
52 annular torque transmitting member
52a second engaging portion
52c, 51b center hole
53 out
54 drill attachment portion
54a first engaging peripheral surface
54b second engaging peripheral surface
54c external screw portion
60 bit attachment hole

BEST MODE FOR CARRYING OUT THE
INVENTION

Figure 1:
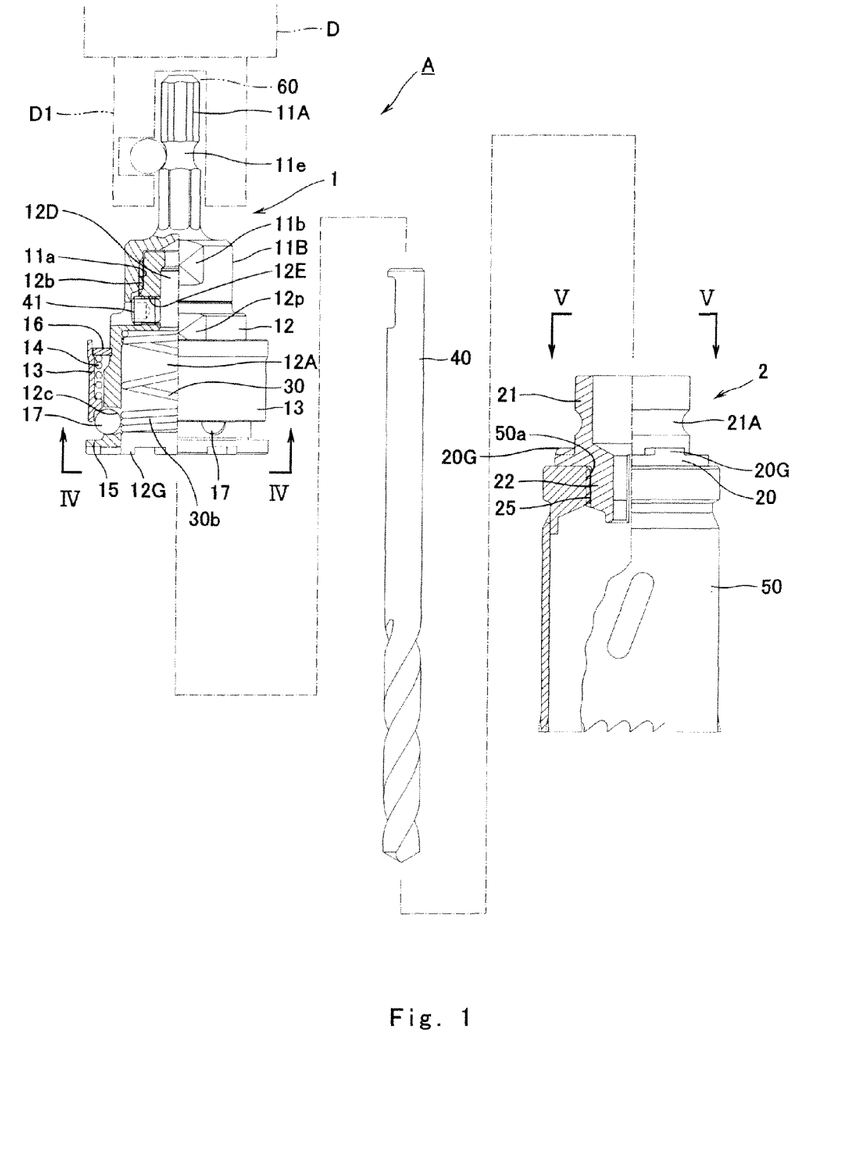
FIG. 1 is a partial cross-sectional front view showing a state where a shank attachment device according to Embodiment 1 of the present invention is disassembled (a state where a shank is detached from an arbor).
Figure 2:
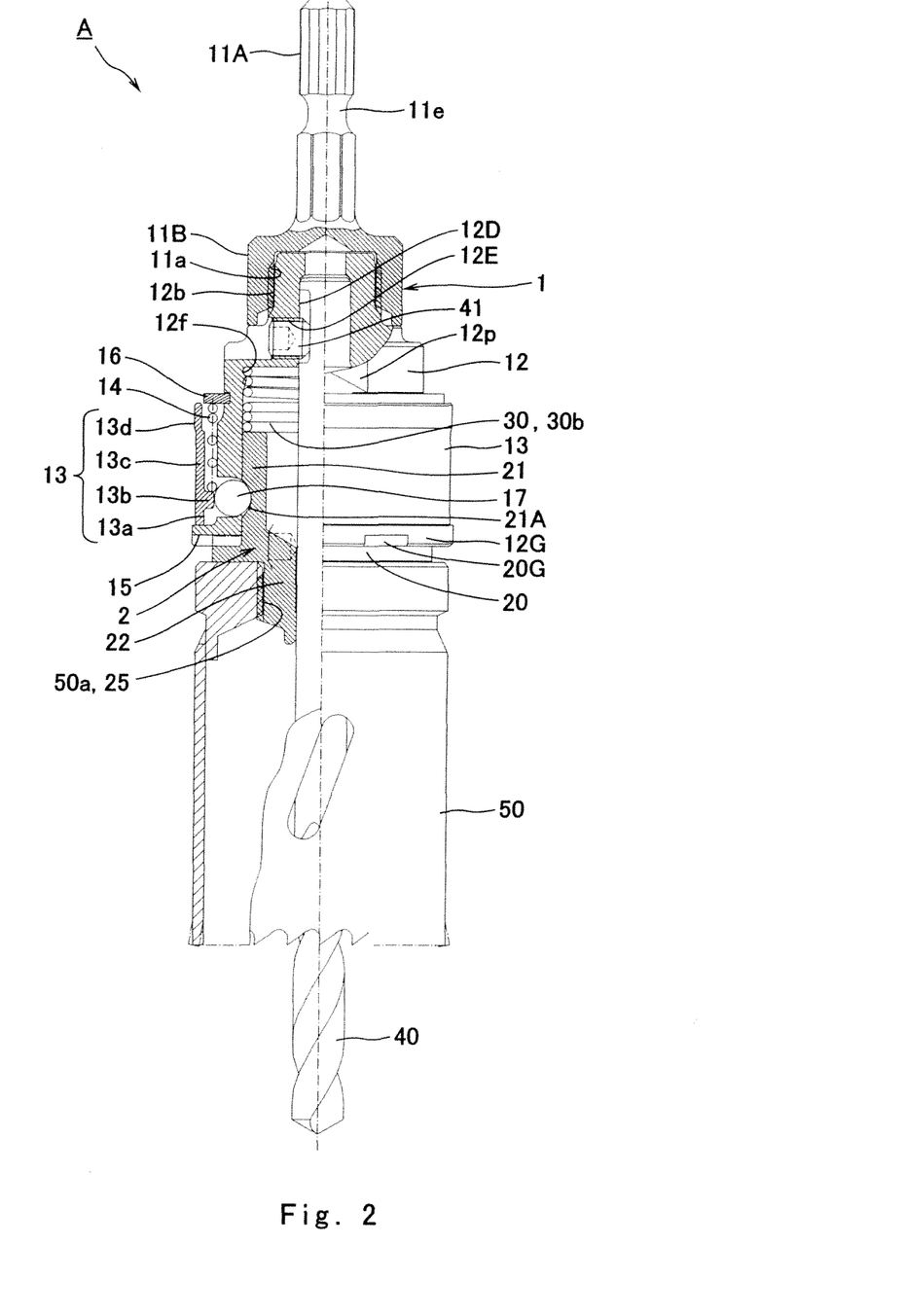
FIG. 2 is a partial cross-sectional front view showing a state where the shank attachment device shown in FIG. 1 is assembled (a state where the shank is attached to the arbor).
Figure 3:
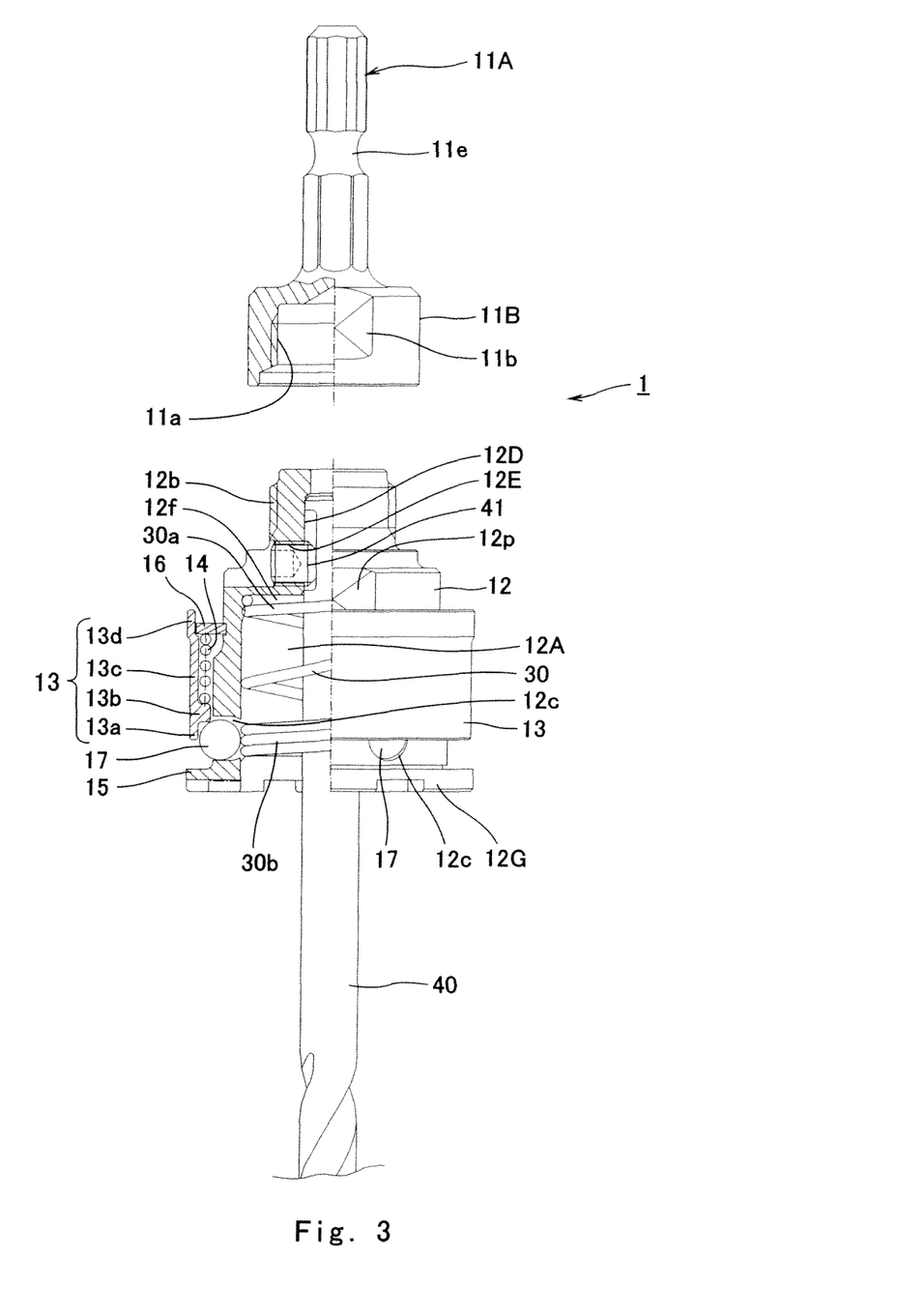
FIG. 3 is a partial cross-sectional enlarged front view showing a state where the arbor of the shank attachment device shown in FIG. 1 is disassembled.

Hereinafter, a shank attachment device according to Embodiment 1 of the present invention will be explained in reference to FIGS. 1 to 5. A shank attachment device A shown in FIGS. 1 and 2 is configured to attach a core drill 50 to a rotating portion D1 of a drill device As shown in FIGS. 1 to 3, an attachment shaft 11A having a hexagonal cross section is formed at a base end portion of the arbor 1. A small diameter engagement groove 11e is formed around the attachment shaft 11A. As shown in FIG. 1, the engagement groove 11e is formed to prevent the shank attachment device A from falling out from the rotating portion D1 when the shank attachment device A is being attached to the rotating portion D1. An enlarged diameter portion 11B is formed integrally with the attachment shaft 11A on a tip end side of the attachment shaft 11A.

As shown in FIG. 3, the enlarged diameter portion 11B is provided with a bottomed internal screw hole 11a which is open toward a tip end and a flat surface 11b which is formed on an outer peripheral surface of the enlarged diameter portion 11B to engage with a spanner or the like. For example, the flat surface 11b is formed at two portions of the outer peripheral surface of the enlarged diameter portion 11B which portions are located 180 degrees away from each other in a circumferential direction of the enlarged diameter portion 11B.

Moreover, as shown in FIG. 3, the arbor 1 includes a base body 12 which threadedly engages with the enlarged diameter portion 11B. An external screw portion 12b which threadedly engages with the internal screw hole 11a of the enlarged diameter portion 11B is formed at a base end portion of the base body 12. By threadedly engaging the external screw portion 12b with the internal screw hole 11a, the attachment shaft 11A coupled to the enlarged diameter portion 11B can be attached to the base body 12. Moreover, by disengaging the external screw portion 12b from the internal screw hole 11a, the attachment shaft 11A can be detached from the base body 12.

Further, as shown in FIG. 3, a shank attachment hole 12A which is open toward the tip end side is formed at a portion of the base body 12 which portion extends from a tip end portion of the base body 12 to a central portion of the base body 12. Then, a stopper member accommodating hole 12c which penetrates the base body 12 in a radial direction thereof is formed at a portion of the base body 12 which portion is located slightly on the base end side of the tip end of the shank attachment hole 12A. Moreover, as shown in FIG. 3, an operating sleeve 13 is disposed at the tip end portion of the base body 12 so as to cover an outer periphery of the tip end portion of the base body 12.

As shown in FIG. 3, the operating sleeve 13 is formed to have a substantially short cylindrical shape and is disposed to be slidable in an axial direction of the arbor 1 (in a vertical direction of FIG. 3) along an outside of the stopper member accommodating hole 12c. Then, as shown in FIG. 3, a cam surface which causes a stopper member (for example, a steel ball) 17 to project into and move back from the shank attachment hole 12A is formed on an inner peripheral surface of the operating sleeve 13.

The cam surface includes: a slightly enlarged diameter portion 13a where the inner peripheral surface of the tip end portion of the operating sleeve 13 is slightly increased in diameter; and a slightly reduced diameter portion 13b which is located on the base end side of the enlarged diameter portion 13a. A step portion having a rectangular cross section is formed at these two portions 13a and 13b. Further, an enlarged diameter portion 13c where the inner peripheral surface is increased in diameter is formed on the base end side of the reduced diameter portion 13b of the operating sleeve 13. Then, an enlarged diameter portion 13d where both the outer peripheral surface and the inner peripheral surface are increased in diameter is formed at the base end portion of the operating sleeve 13. A step portion is formed at a boundary between the enlarged diameter portion 13d and the enlarged diameter portion 13c.

Moreover, as shown in FIG. 2, a coil spring 14 is attached inside the operating sleeve 13, and the operating sleeve 13 is biased by the coil spring 14 toward the tip end side (downward direction) of the base body 12. However, since the operating sleeve 13 contacts a flange portion 15, the operating sleeve 13 is prevented from moving beyond the flange portion 15 toward the tip end side. In addition, since the operating sleeve 13 contacts a stopper ring 16 located on the base end side thereof, the operating sleeve 13 is prevented from moving beyond the stopper ring 16 toward the base end side.

As above, the operating sleeve 13 is slidable within a predetermined distance in a vertical direction of FIG. 2. To be specific, as shown in FIG. 2, in a state where the operating sleeve 13 is located at a lower position by the spring force of the coil spring 14, the reduced diameter portion 13b can press the stopper member 17 to cause the stopper member 17 to project into the shank attachment hole 12A.

Then, as shown in FIG. 3, in a state where the shank 2 is detached from the arbor 1, i.e., in a state where the operating sleeve 13 is located at an upper position against the spring force of the coil spring 14, the enlarged diameter portion 13a can accommodate the stopper member 17 to cause the stopper member 17 to move back from the shank attachment hole 12A to the stopper member accommodating hole 12c, i.e., to cause the stopper member 17 not to project into the shank attachment hole 12A.

In the present embodiment, a shank attachment hole 12A side inner diameter of the stopper member accommodating hole 12c is slightly reduced in diameter to prevent the stopper member 17 from falling out from the stopper member accommodating hole 12c into the shank attachment hole 12A.

Moreover, as shown in FIG. 3, a coil spring 30 formed to have an outer diameter slightly smaller than the inner diameter of the shank attachment hole 12A is attached inside the shank attachment hole 12A. The coil spring 30 has a function of pressing the shank 2 toward the tip end side and a function, as a supporting member, of preventing the stopper member 17 from projecting into (or falling out from) the shank attachment hole 12A.

As shown in FIG. 3, the coil spring 30 is formed such that each of a roll pitch of a double-thread base end portion 30a and a roll pitch of a triple-thread tip end portion (supporting member) 30b is substantially equal to a diameter of a wire rod of the coil spring 30. Then, the base end portion 30a is engageably attached to an engaging groove portion 12f that is a ring-shaped groove formed around the base end of the shank attachment hole 12A. Moreover, the tip end portion (supporting member) 30b of the coil spring 30 is formed to extend such that in a state where the shank 2 is not inserted into the shank attachment hole 12A, the tip end portion 30b covers a shank attachment hole 12A side opening of the stopper member accommodating hole 12c from inside. In this state, the tip end portion 30b biases the stopper member 17 to an outside direction, so that the stopper member 17 does not project into the shank attachment hole 12A.

Moreover, as shown in FIG. 2, a center drill attachment hole 12D is formed on the base body 12. The center drill attachment hole 12D is formed to have an internal diameter such that a center drill 40 can be inserted thereinto, and is formed such that the center drill 40 can be attached to a rotation center of the base body 12. Then, the center drill attachment hole 12D is communicated with the base end side of the shank attachment hole 12A, and has a smaller diameter than the shank attachment hole 12A.

Then, as shown in FIG. 2, a fixing screw hole 12E including an internal screw on an inner peripheral surface thereof is formed on the base body 12 to extend from the outer peripheral surface of the base body 12 to the center of the center drill attachment hole 12D in a direction perpendicular to the center drill attachment hole 12D. Then, a fixing bolt 41 including a hexagonal wrench hole threadedly engages with the fixing screw hole 12E. To be specific, the base end portion of the center drill 40 can be fixed to the center drill attachment hole 12D by the fixing bolt 41. Moreover, the fixing bolt 41 is configured such that in a state where the fixing bolt 41 threadedly engages with the fixing screw hole 12E to fix the center drill 40, the base end (outside end portion) of the fixing bolt 41 is located in the vicinity of an outside opening edge portion of the fixing screw hole 12E. In this state, at least a part of the base end of the fixing bolt 41 is covered with the tip end portion of the internal screw hole 11a of the enlarged diameter portion 11B. Moreover, the fixing bolt 41 is formed to have a length longer than a distance between an internal wall of the center drill attachment hole 12D and an internal wall of the internal screw hole 11a of the enlarged diameter portion 11B.

Moreover, a flat surface 12p which engages with a spanner or the like is formed on the outer surface of the base body 12. The flat surface 12p is formed in the vicinity of the enlarged diameter portion 11B which threadedly engages with the base body 12. Then, the flat surface 12p is formed at two portions of the outer peripheral surface of the base body 12 which portions are located 180 degrees away from each other.

Moreover, as shown in FIG. 1, a first engaging portion 12G is formed on a lower surface of the flange portion 15 of the base body 12. The first engaging portion 12G can engage with, in a rotational direction, a first engaged portion 20G formed on an upper surface of a flange portion 20 of the shank 2.

Next, the shank 2 will be explained. As shown in FIG. 1, an inserting portion 21 is formed at a base end portion of the shank 2, and a drill attachment portion 22 is formed at a tip end portion of the shank 2. The inserting portion 21 is a portion inserted into the shank attachment hole 12A, and the drill attachment portion 22 is a portion to which the drill (in the present embodiment, the core drill) 50 is attached.

As shown in FIG. 1, the inserting portion 21 has a substantially short cylindrical shape having an external diameter slightly smaller than the diameter of the shank attachment hole 12A. Then, a stopper groove 21A with which the stopper member 17 of the arbor 1 engages is formed on an outer peripheral surface of the inserting portion 21.

As shown in FIG. 1, the drill attachment portion 22 has a substantially short cylindrical shape, and an external screw 25 is formed on an outer peripheral surface of the drill attachment portion 22. The external screw 25 can threadedly engage with an internal screw 50a formed on an inner peripheral surface of the core drill 50. Therefore, by threadedly engaging the internal screw 50a of the core drill 50 with the external screw 25 formed on the shank 2, the core drill 50 can be attached to the shank 2.

In the shank attachment device A shown in FIG. 1, the shank 2 to which the core drill 50 can be attached is adopted. However, in a case where the drill to be attached is a drill other than the core drill 50, and has a columnar external shape similar to that of the center drill 40 shown in FIG. 1 for example, cuts with its cutting edge formed at its tip end, and has a chip discharging groove formed in a spiral manner on its outer peripheral surface, it is possible to use, instead of the shank 2 shown in FIG. 1, the shank in which the drill attachment portion is provided with a screw clamp structure using a bolt similar to the fixing bolt 41 shown in FIG. 1. Or, it is possible to use a shank including a sandwiching mechanism of sandwiching a conventionally known drill by a chuck thereof to attach the drill to a rotating shaft of a drill device.

Moreover, as shown in FIG. 1, the flange portion 20 is formed between the inserting portion 21 and the drill attachment portion 22, and the first engaged portion 20G is formed on the upper surface of the flange portion 20. The first engaged portion 20G is formed to be able to engage with the first engaging portion 12G formed on a lower surface of the arbor 1. With this, the rotational torque of the arbor 1 can be transmitted to the shank 2 through the first engaging portion 12G and the first engaged portion 20G which engage with each other.

Figure 4:
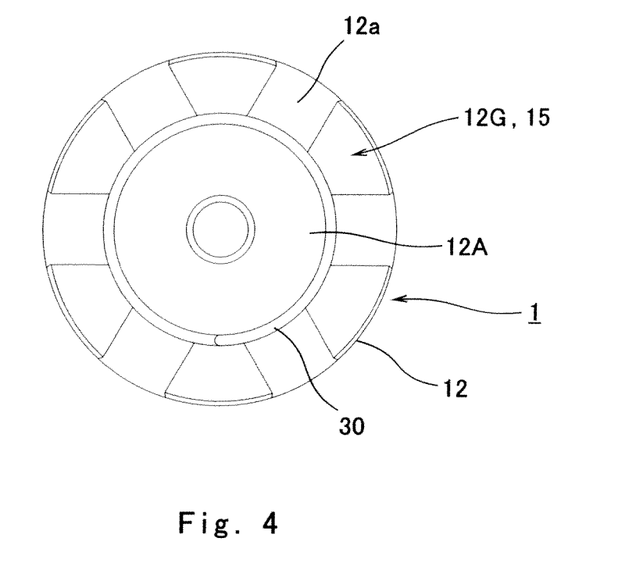
FIG. 4 is a diagram showing a first engaging portion of the shank attachment device shown in FIG. 1 when viewed from a direction indicated by arrows IV-IV of FIG. 1.
Figure 5:
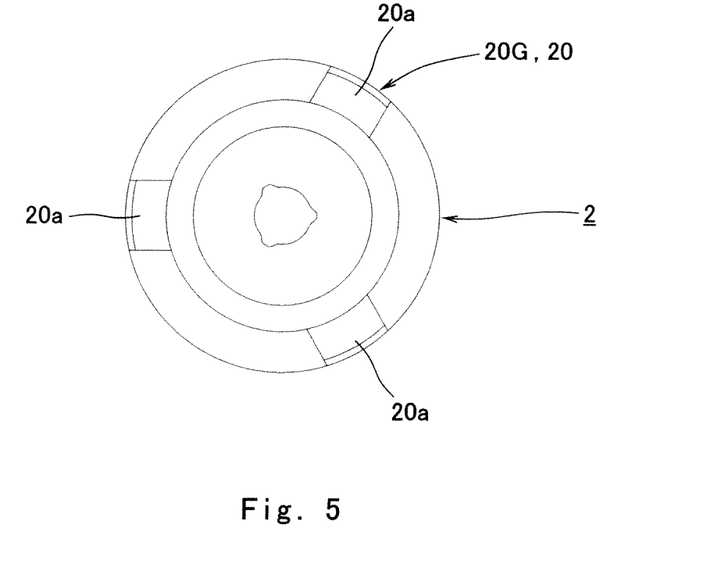
FIG. 5 is a diagram showing a first engaged portion of the shank attachment device shown in FIG. 1 when viewed from a direction indicated by arrows V-V of FIG. 1.

As shown in FIG. 5, in the first engaged portion 20G, three convex portions 20a are formed to be 120 degrees away from each other in a circumferential direction of the first engaged portion 20G. Then, as shown in FIG. 4, in the first engaging portion 12G, six concave portions 12a which can engage with the convex portions 20a of the first engaged portion 20G are formed to be 60 degrees away from each other in a circumferential direction of the first engaging portion 12G. Therefore, when attaching the shank 2 to the arbor 1, for example, the shank 2 can be rotated at 60 degrees in the circumferential direction to engage the convex portions 20a with the concave portions 12a.

Next, a procedure for carrying out the hole drilling operation with respect to a workpiece by using the shank attachment device A configured as above, and functions and effects of the shank attachment device A will be explained. First, as shown in FIG. 1, for example, the core drill 50 is attached to the shank 2. When attaching the core drill 50 to the shank 2, the internal screw 50a of the core drill 50 may be caused to threadedly engage with the external screw 25 of the shank 2, and be tightened up.

Then, as shown in FIG. 2, the shank 2 to which the core drill 50 has been attached is attached to the arbor 1. To be specific, the inserting portion 21 of the shank 2 is inserted into the shank attachment hole 12A of the arbor 1. In the process of this insertion, the tip end of the shank 2 presses the tip end portion 30b of the coil spring 30 toward a deep side of the shank attachment hole 12A to a level that the stopper member 17 can move into the shank attachment hole 12A. With this, the stopper member 17 contacts the outer peripheral surface of the inserting portion 21, and the lower surface of the flange portion 15 contacts the upper surface of the flange portion 20. Next, by rotating the shank 2 with respect to the arbor 1 at a suitable angle (at least 60 degrees or less) according to need, the concave portions 12a of the first engaging portion 12G and the convex portions 20a of the first engaged portion 20G engage with each other. Then, by further inserting the inserting portion 21 of the shank 2 toward the deep side of the shank attachment hole 12A, the stopper member 17 engages with the stopper groove 21A of the inserting portion 21. Thus, as shown in FIG. 2, the shank 2 can be attached to the arbor 1.

As shown in FIG. 2, in a state where the shank 2 is attached to the arbor 1, the operating sleeve 13 biased by the coil spring 14 moves downward and contacts the flange portion 15. At this time, the reduced diameter portion 13b presses the stopper member 17 onto the stopper groove 21A.

Then, after or before attaching the shank 2 to the arbor 1, as shown in FIG. 2, the base end portion of the center drill 40 is inserted into and attached to the center drill attachment hole 12D of the arbor 1. At this time, the fixing bolt 41 is tightened up in the fixing screw hole 12E, so that the center drill 40 is fixed to the base body 12 of the arbor 1.

Next, as shown in FIG. 1, the attachment shaft 11A of the arbor 1 is attached to a bit attachment hole 60 of the drill device D, such as an electrically-powered drill. By causing the drill device D to operate, a desired hole can be cut using the core drill 50 and the center drill 40.

Moreover, since the stopper member 17 disposed on the arbor 1 engages with the stopper groove 21A formed on the shank 2 with the shank 2 attached to the arbor 1 as shown in FIG. 2, it is possible to stop the movement of the shank 2 in the axial direction away from the arbor 1, so that the shank 2 is not detached from the arbor 1. Further, in this state, the first engaging portion 12G formed on the arbor 1 engages with the first engaged portion 20G formed on the shank 2. Therefore, it is possible to transmit high rotational torque and impulsive rotational torque from the arbor 1 to the shank 2.

Then, in this state, the flange portion 20 of the shank 2 contacts the flange portion 15 of the arbor 1, so that it is possible to surely stop the movement of the shank 2 in the axial direction toward the arbor 1. Therefore, the arbor 1 can receive an axial impact generated in the hole drilling operation through the flange portions 15 and 20. With this, it is possible to effectively carry out the hole drilling operation.

Moreover, the core drill 50 is detachably attached to the shank 2. Therefore, if the core drill 50 that is a consumable member is worn, only the core drill 50 may be replaced, and the shank 2 can be continuously used.

Further, instead of the core drill 50 shown in FIG. 1, a core drill which is different in the external diameter from the core drill 50 can be used by being attached to the shank 2. To be specific, a core drill having a different size can be attached to the shank 2 by forming this core drill such that the internal screw 50a of the core drill can threadedly engage with the external screw 25 of the drill attachment portion 22.

Moreover, in accordance with the shank attachment device A of the present embodiment, in a case where the shank attachment device A is designed to be able to adequately endure the rotational torque impulsively applied thereto, the strength of the first engaging portion 12G of the arbor 1 in a direction in which the rotational torque is applied and the strength of the first engaged portion 20G of the shank 2 in a direction in which the rotational torque is applied may be increased. Therefore, it is unnecessary to increase the strength of engagement of the stopper member 17 with the stopper groove 21A which engagement stops the movement of the shank 2 in the axial direction away from the arbor 1. On this account, the shank attachment device A can be comparatively reduced in size. Moreover, the flange portions 15 and 20 that are contact portions of the shank 2 and the arbor 1 can receive the axial impact generated in the hole drilling operations. Therefore, it is unnecessary to consider the strengths of the first engaging portion 12G, the first engaged portion 20G, the stopper member 17, and the stopper groove 21A with respect to the axial impact. On this account, the shank attachment device A can be reduced in size.

Further, as shown in FIG. 3, the arbor 1 is configured to be divisible into an attachment shaft 11A side portion and a base body 12 side portion which are detachably attachable to each other by the external screw portion 12b and the internal screw hole 11a. With this, when the attachment shaft 11A is damaged, the damaged attachment shaft 11A side portion can be replaced with a different attachment shaft 11A side portion. In this case, since it is unnecessary to replace the base body 12 side portion, it is economical.

Then, as shown in FIG. 2, with the center drill 40 inserted into the center drill attachment hole 12D, the center drill 40 can be fixed to the base body 12 of the arbor 1 by the fixing screw 41. The fixing screw 41 may loosen by vibrations of the hole drilling operations using the core drill 50 and the center drill 40. However, since the enlarged diameter portion 11B of the arbor 1 covers from outside at least a part of the fixing screw 41 which threadedly engages with the fixing screw hole 12E, it is possible to prevent the fixing screw 41 from falling out from the base body 12.

Moreover, as shown in FIG. 1, the shank attachment device A includes the supporting member (tip end 30b) which prevents the stopper member 17 from projecting into the shank attachment hole 12A in a state where the shank 2 is not attached to the shank attachment hole 12A. The supporting member is formed by the tip end 30b of the coil spring 30 disposed in the shank attachment hole 12A. Thus, by forming the supporting member, which prevents the stopper member 17 from projecting into the shank attachment hole 12A, by the tip end 30b of the coil spring 30 disposed in the shank attachment hole 12A, it is possible to reduce the number of components only by the supporting member.

Further, the shank attachment device A shown in FIG. 2 is configured such that the shank 2 can be detached from the arbor 1 by causing the operating sleeve 13 to move upward along the axial direction. Therefore, even if an inertia force in the rotational direction is applied to the shank attachment device A with the shank attachment device A attached to the drill device D and used, the operating sleeve 13 does not move in the rotational direction due to the inertia force, the stopper member 17 does not move back from the shank attachment hole 12A, and the shank 2 does not fall out from the arbor 1.

When detaching the shank 2 from the arbor 1 in the state shown in FIG. 2, the operator may cause the operating sleeve 13 to move toward the base end side (upward). With this, the stopper member 17 moves toward the outside, and the shank 2 is pressed out from the shank attachment hole 12A of the arbor 1 toward the tip end side by a biasing force of the coil spring 30.

Figure 6:
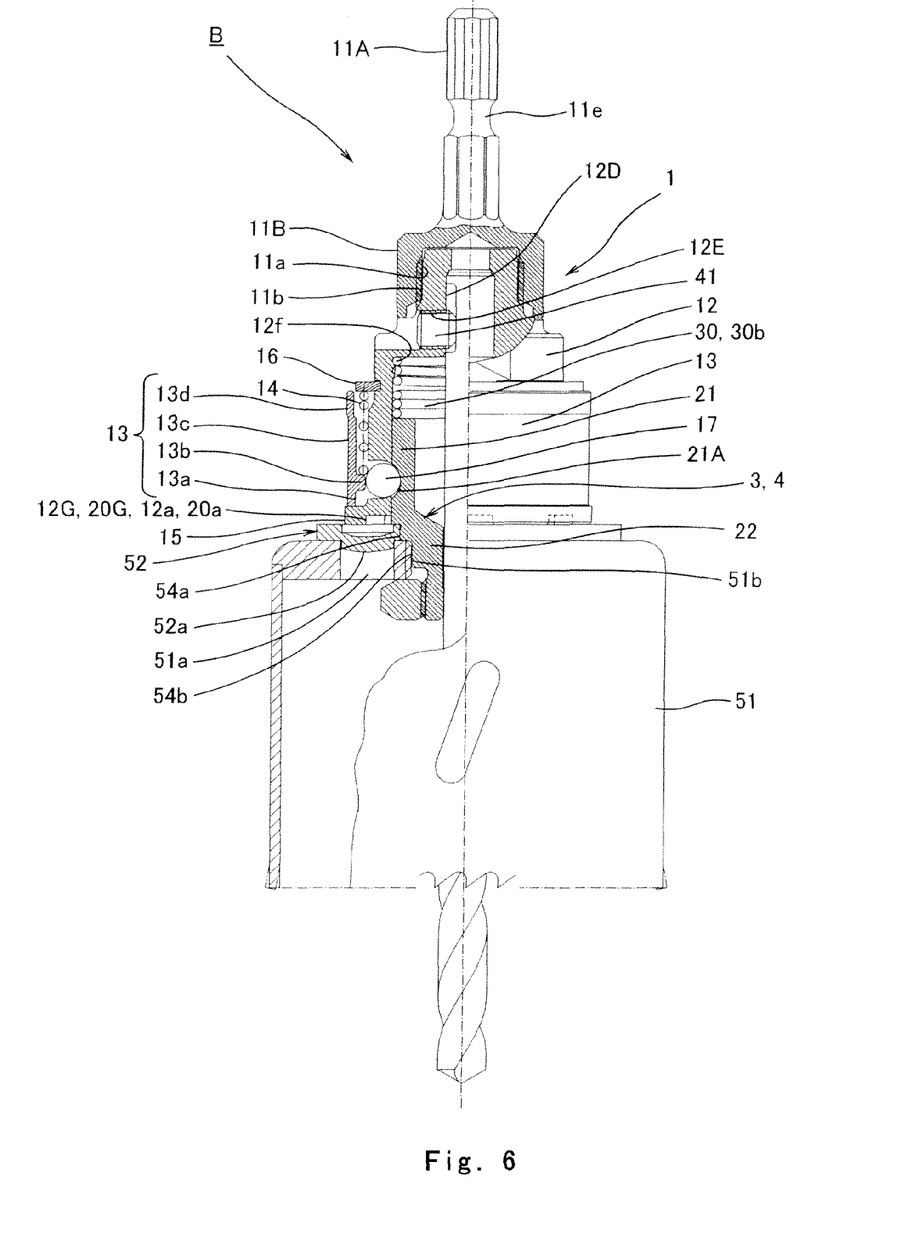
FIG. 6 is a partial cross-sectional front view showing a state where the shank attachment device according to Embodiment 2 of the present invention is assembled (a state where the shank is attached to the arbor).
Figure 7:
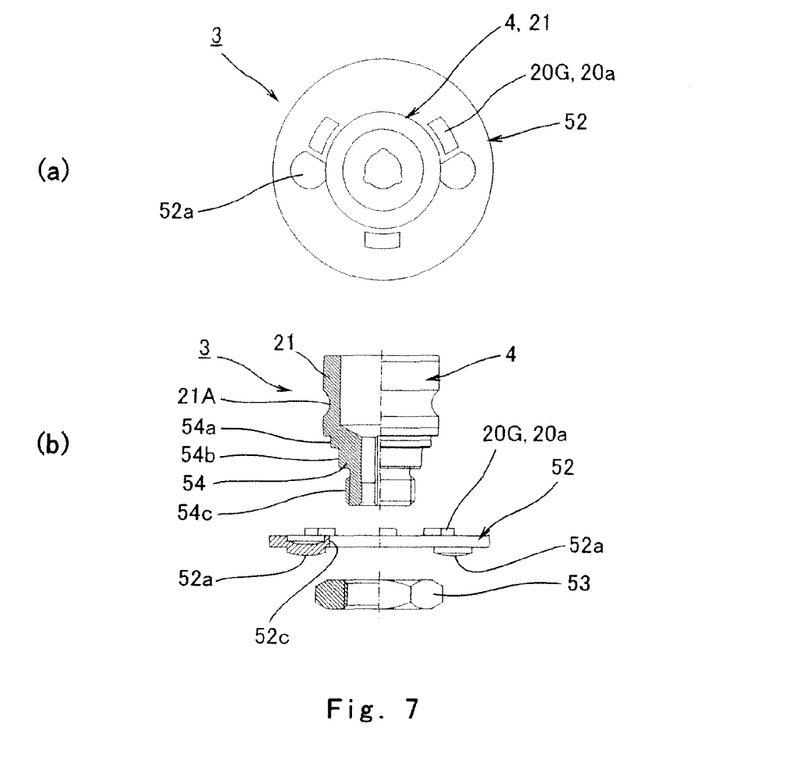
FIG. 7(a) is a plan view showing the shank of FIG. 6.
FIG. 7(b) is a partial cross-sectional front view showing a state where the shank of FIG. 6 is disassembled.
Figure 8:
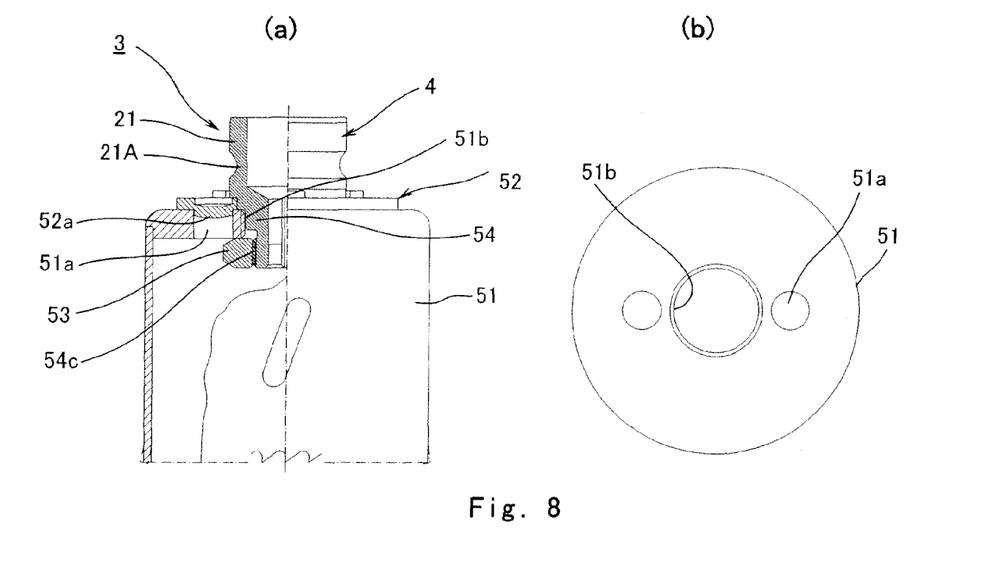
FIG. 8(a) is a partial cross-sectional front view showing a state where the shank of FIG. 6 is attached to a core drill.
FIG. 8(b) is a plan view of the core drill attached to the shank of FIG. 8(a).

Next, a shank attachment device B according to Embodiment 2 of the present invention will be explained in reference to FIGS. 6 to 8. The shank attachment device B according to Embodiment 2 shown in FIG. 6 and the shank attachment device A according to Embodiment 1 shown in FIG. 2 are different from each other regarding how a core drill 51 is attached to a shank 3 and how the core drill 51 is attached to the shank 3. Other than this, the shank attachment device B according to Embodiment 2 shown in FIG. 6 is the same as the shank attachment device A according to Embodiment 1 shown in FIG. 2. Same reference numbers are used for the same members, and explanations thereof are omitted As shown in FIG. 6, in accordance with the shank attachment device B of Embodiment 2, the core drill 51 having a comparatively large external diameter can be attached to the shank attachment device B. Therefore, a hole having a comparatively large diameter can be formed by using the core drill 51. FIG. 7(a) is a plan view showing a state where the shank 3 is assembled. FIG. 7(b) is a partial cross-sectional front view showing a state where the shank 3 is disassembled. As shown in FIG. 7(b), the shank 3 includes a shank main body 4, an annular torque transmitting member 52, and a nut 53. Then, the shank main body 4 includes the inserting portion 21 and a drill attachment portion 54. As shown in FIG. 8(a), the inserting portion 21 of the shank main body 4 is the same as the inserting portion 21 of Embodiment 1 shown in FIG. 1.

As shown in FIG. 8(a), the drill attachment portion 54 is formed to have a substantially short cylindrical shape, and includes on an outer peripheral surface thereof: a first engaging peripheral surface 54a to which the annular torque transmitting member 52 is attached; a second engaging peripheral surface 54b to which a top plate of the core drill 51 is attached; and an external screw portion 54c with which the nut 53 threadedly engages. The first engaging peripheral surface 54a is formed to have a largest external diameter, the second engaging peripheral surface 54b is formed to have a smaller external diameter than the first engaging peripheral surface 54a, and the external screw portion 54c is formed to have a smallest external diameter.

As shown in FIGS. 7 and 8, the annular torque transmitting member 52 is a substantially annular plate-like body, the first engaged portion 20G is formed on an upper surface thereof, and a second engaging portion 52a is formed on a lower surface thereof. The first engaged portion 20G includes three convex portion 20a similar to those of Embodiment 1. Moreover, six concave portions 12a are formed on the lower surface of the flange portion 15 of the arbor 1 shown in FIG. 6 such that these three convex portions 20a can engage with these six concave portions 12a. These six concave portions 12a are the first engaging portions 12G, and are similar to those of Embodiment 1.

The second engaging portion 52a is formed to be able to engage with a second engaged portion 51a formed on the top plate of the core drill 51. With this, the rotational torque of the shank 3 can be transmitted to the core drill 51 through the second engaging portion 52a and the second engaged portion 51a which engage with each other.

As shown in FIGS. 7(a) and 7(b), the second engaging portion 52a is a convex portion, and is formed at two portions of the lower surface of the annular torque transmitting member 52 which portions are 180 degrees away from each other in a circumferential direction of the annular torque transmitting member 52. Then, as shown in FIGS. 8(a) and 8(b), the second engaged portion 51a is a concave portion (small hole) which can engage with the convex portion that is the second engaging portion 52a, and is formed at two portions of the top plate of the core drill 51 which portions are 180 degrees away from each other in a circumferential direction of the core drill 51.

When attaching the annular torque transmitting member 52 and the core drill 51 to the shank main body 4 configured as above, as shown in FIG. 8(a), first, a center hole 52c of the annular torque transmitting member 52 and a center hole 51b of the core drill 51 are sequentially attached to the drill attachment portion 54, and the second engaging portion 52a of the annular torque transmitting member 52 and the second engaged portion 51a of the core drill 51 are caused to engage with each other. Then, the out 53 is caused to threadedly engage with the external screw portion 54c of the shank 3 and be tightened up. Then, as with Embodiment 1, as shown in FIG. 6, the shank 3 to which the core drill 51 has been attached is attached to the arbor 1.

Then, as with Embodiment 1, as shown in FIG. 6, the base end portion of the center drill 40 is inserted into the center drill attachment hole 12D of the arbor 1, and the center drill 40 is fixed to the arbor 1 by the fixing bolt 41.

Next, as shown in FIG. 1, the attachment shaft 11A of the arbor 1 is attached to the bit attachment hole 60 of, for example, the drill device D which is rechargeable. By causing the drill device D to operate, a desired hole can be cut using the core drill 51 and the center drill 40.

In accordance with the shank attachment device B configured as above, as shown in FIG. 6, in a state where the core drill 51 is attached to the shank 3, and the shank 3 is attached to the arbor 1, the rotational torque of the arbor 1 can be transmitted to the core drill 51 through the annular torque transmitting member 52. Then, since the second engaging portion 52a formed on the annular torque transmitting member 52 engages with the second engaged portion 51a formed on the core drill 51, the comparatively high rotational torque of the shank 3 can be transmitted to the core drill 51. Thus, it is possible to cut a hole having a comparatively large diameter.

Then, as shown in FIGS. 1, 6, and 7, in a case where the first engaging portion 12G is the concave portion 12a (or the convex portion), the first engaged portion 20G is the convex portion 20a (or the concave portion), the second engaging portion 52a is the concave portion (or the convex portion), and the second engaged portion 51a is the convex portion (or the concave portion), the comparatively high rotational torque of the arbor 1 can be transmitted to the shank 3, and the comparatively high rotational torque of the shank 3 can be transmitted to the core drill 51 by a comparatively simple configuration.

Moreover, as shown in FIG. 6, the first engaged portion 20G and the second engaging portion 52a, are formed on the annular torque transmitting member 52, and the annular torque transmitting member 52 and the core drill 51 engage with each other, and are fastened to the shank 3 by the nut 53. Therefore, by increasing the diameter of the annular torque transmitting member 52 and increasing the distance from the rotation center to each of the first engaging portion 12G, the first engaged portion 20G, the second engaging portion 52a, and the second engaged portion 51a, the comparatively high rotational torque can be transmitted. Then, since the annular torque transmitting member 52 can be manufactured separately from the arbor 1 and the shank 3, it can be manufactured comparatively easily as compared to a case where it is manufactured integrally with the arbor 1 and the shank 3. Other than this, Embodiment 2 functions in the same manner as Embodiment 1, so that explanations of those functions are omitted.

Although the shank main body 4 and the annular torque transmitting member 52 are separate members in Embodiment 2 shown in FIG. 6, these members may be formed integrally.

INDUSTRIAL APPLICABILITY

As above, a shank attachment device according to the present invention has excellent effects, i.e., is capable of transmitting a comparatively high rotational torque and comparatively reducing in size, and is suitable to be applied to such shank attachment device.

The invention claimed is:

1. A shank attachment device configured to attach a drill to a rotating portion of a drill device and comprising an arbor and a shank, the arbor being detachably attachable to the rotating portion, the arbor and the shank being detachably attachable to each other, and the shank being detachably attachable to the drill, wherein:
   with the shank attached to the arbor, a stopper member disposed on the arbor engages with a stopper groove formed on a side surface of the shank to stop a movement of the shank in an axial direction away from the arbor; a first engaging portion formed on the arbor engages with a first engaged portion formed on the shank to enable a rotational torque of the arbor to be transmitted to the shank; and the shank contacts the arbor to stop the movement of the shank in the axial direction toward the arbor;
   the arbor includes an attachment shaft attached to the rotating portion of the drill device, an enlarged diameter portion is formed at a tip end portion of the attachment shaft, and the enlarged diameter portion is detachably coupled to a base body of the arbor by a screw;
   the shank is configured to be detachably attached to a shank attachment hole formed on the arbor;
   a center drill attachment hole communicated with the shank attachment hole is formed on the base body of the arbor;
   a fixing screw hole including an internal screw on an inner peripheral surface thereof is formed to extend from an outer peripheral surface of the base body to a center of the center drill attachment hole in a direction perpendicular to the center drill attachment hole;
   a fixing screw threadedly engages with the fixing screw hole such that a tip end thereof is able to project into the center drill attachment hole; and
   the enlarged diameter portion covers from outside at least a part of the fixing screw, which threadedly engages with the fixing screw hole, to prevent the fixing screw from falling out to an outside of the base body.

2. The shank attachment device according to claim 1, wherein with the drill attached to the shank, a second engaging portion formed on the shank engages with a second engaged portion formed on the drill to enable a rotational torque of the shank to be transmitted to the drill.

3. The shank attachment device according to claim 2, wherein:
   the first engaging portion is a concave portion or a convex portion, and the first engaged portion is a convex portion or a concave portion; and
   the second engaging portion is a concave portion or a convex portion, and the second engaged portion is a convex portion or a concave portion.

4. The shank attachment device according to claim 3, wherein: the first engaged portion and the second engaging portion are formed on an annular torque transmitting member; and with the annular torque transmitting member and the drill engaging with each other, the annular torque transmitting member and the drill are fastened to the shank by a screw.

5. The shank attachment device according to claim 3, wherein the shank is configured to be detachably attached to the shank attachment hole formed on the arbor,
   the shank attachment device further comprising a supporting member which prevents the stopper member from projecting into the shank attachment hole in a state where the shank is not attached to the shank attachment hole, wherein:
   the supporting member is formed by a tip end of a coil spring disposed in the shank attachment hole; and
   a base end portion of the coil spring is engageably attached to an engaging groove portion formed around an inner peripheral surface of a deep side portion of the shank attachment hole.

6. The shank attachment device according to claim 2, wherein: the first engaged portion and the second engaging portion, are formed on an annular torque transmitting member; and with the annular torque transmitting member and the drill engaging with each other, the annular torque transmitting member and the drill are fastened to the shank by a screw.

7. The shank attachment device according to claim 2, wherein the shank is configured to be detachably attached to the shank attachment hole formed on the arbor,
   the shank attachment device further comprising a supporting member which prevents the stopper member from projecting into the shank attachment hole in a state where the shank is not attached to the shank attachment hole, wherein:
   the supporting member is formed by a tip end of a coil spring disposed in the shank attachment hole; and
   a base end portion of the coil spring is engageably attached to an engaging groove portion formed around an inner peripheral surface of a deep side portion of the shank attachment hole.

8. The shank attachment device according to claim 1, wherein the shank is configured to be detachably attached to the shank attachment hole formed on the arbor,
   the shank attachment device further comprising a supporting member which prevents the stopper member from projecting into the shank attachment hole in a state where the shank is not attached to the shank attachment hole, wherein:

the supporting member is formed by a tip end of a coil spring disposed in the shank attachment hole; and a base end portion of the coil spring is engageably attached to an engaging groove portion formed around an inner peripheral surface of a deep side portion of the shank attachment hole.

* * * * *

UNITED STATES PATENT AND TRADEMARK OFFICE
CERTIFICATE OF CORRECTION

PATENT NO. : 8,608,413 B2 Page 1 of 1
APPLICATION NO. : 12/513130
DATED : December 17, 2013
INVENTOR(S) : Masaaki Miyanaga It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1226 days.

Signed and Sealed this
Twenty-second Day of September, 2015

Michelle K. Lee
*Director of the United States Patent and Trademark Office*